United States Patent [19]

Shibata et al.

[11] 3,956,562

[45] May 11, 1976

[54] ELECTROSTATIC RECORDING MATERIAL

[75] Inventors: Kazuo Shibata, Nishinomiya; Tadashi Tanimoto, Amagasaki, both of Japan

[73] Assignee: Kanzaki Paper Manufacturing Co., Ltd., Tokyo, Japan

[22] Filed: Mar. 5, 1974

[21] Appl. No.: 448,373

[30] Foreign Application Priority Data

Mar. 10, 1973 Japan .............................. 48-28292

[52] U.S. Cl. .................................. 428/323; 96/1.8; 427/58; 427/113; 427/121; 427/123; 427/126; 428/447; 428/461; 428/500; 428/507; 428/512; 428/900

[51] Int. Cl.$^2$ ........................ B32B 5/28; B32B 5/16

[58] Field of Search ............ 117/201, 100 B, 100 S; 96/1.8; 427/121, 58, 113, 126, 123; 428/323, 447, 900

[56] References Cited

UNITED STATES PATENTS

| | | | |
|---|---|---|---|
| 3,639,640 | 1/1972 | Gager | 117/201 X |
| 3,793,642 | 2/1974 | Obu et al. | 117/201 X |

*Primary Examiner*—Mayer Weinblatt
*Attorney, Agent, or Firm*—Morgan, Finnegan, Pine, Foley & Lee

[57] ABSTRACT

An electrostatic recording material having excellent recording characteristics is obtained by coating an electrically conductive substrate with a coating composition comprising an insulating polymer and pigment particles on which is adsorbed a fatty acid having at least five carbon atoms, ester or salt thereof, or resin acid or salt thereof.

12 Claims, 2 Drawing Figures

ELECTROSTATIC RECORDING MATERIAL

BACKGROUND OF THE INVENTION

This invention relates to an improved electrostatic recording material having a dielectric recording layer formed on a surface of a base sheet and an improved method for the production of the same.

The electrostatic recording system has recently been widely applied to a facsimile or a computer input-output system or the like as a system suitable for high speed recording in a speed telecommunication system, a high speed graphic reproduction system, etc. The electrostatic recording material as a recording medium basically comprises a highly dielectric film layer, which serves as an electric-charge-retentive layer, and a base sheet of lower resistance, which supports the film layer. The dielectric layer of the electrostatic recording material comprises an insulating polymeric material. For example, the dielectric layer is produced by applying to a base sheet a coating composition prepared by dissolving polystyrene, polyacrylate, polyvinylidene chloride, polyvinyl acetate, polyacetal, nitrocellulose or silicone resin in an organic solvent such as acetone, toluene, benzene or methyl ethyl ketone, or a coating composition comprising an emulsion of a copolymer of vinyl acetate with acrylic ester, a copolymer of vinyl acetate with methacrylic ester, a copolymer of vinylacetate with styrene or a copolymer of vinyl acetate with crotonic acid.

Electrostatic images of an electrical signal formed on the electric-charge-retention layer are made visible by a toner which has a polarity opposite to the polarity of the electrostatic image charge, and brought into permanent visible images by further fixing treatment. The electrostatic recording process usually involves electric discharge between a voltage applying electrode and the electric-charge-retentive layer. In order to carry out an effective and uniform electrification with a relatively low discharge voltage it is desired to make the surface of the electric-charge-retentive layer relatively rough unless it produces any white spots in the recorded images or it lowers distinctiveness of the recorded images. Such a surface condition of the electric-charge-retentive layer as this is particularly required for an electrostatic recording system having a high resolving power and a high recording speed.

It is conventional to add pigment powder to an insulating resin coating composition for forming a dielectric layer to make the surface of the dielectric layer rough, whereby a mat finished surface having an improved writability is obtained. Heretofore it has been inevitable that addition of such pigment powder causes a decrease in the electric resistance of the dielectric layer formed, deterioration of electrostatic characteristics such as charge acceptance and charge decay and lack of moisture resistance.

The primary object of the invention is to provide an improved electrostatic recording material having a finely roughened dielectric layer surface on which clear images can be recorded.

Another object of the invention is to provide an improved electrostatic recording material having a mat-finished appearance similar to that of commonly used business papers.

A further object of the invention is to provide an improved electrostatic recording material having a good receptivity and a good retentivity for writing and marking.

Other objects and advantages of the invention will become apparent from the following description.

SUMMARY OF THE INVENTION

The electrostatic recording material according to the invention comprises an electrically conductive substrate and a dielectric layer formed on a surface thereof. The dielectric layer is essentially formed with an insulating polymeric material and finely divided pigment powder or particles. The invention is especially characterized in that the pigment particles are treated with and carry thereon a surface treatment agent which is a member selected from the group consisting of fatty acids having at least 5 carbon atoms, esters thereof with glycerin or alcohols, salts of said fatty acids, resin acids, salts of resin acids and mixtures of the foregoing.

The pigment particles contained in the dielectric layer may preferably be finely divided powder of an inorganic pigment which is a member selected from the group consisting of calcium carbonate, titanium oxide, zinc oxide, barium sulfate, kaolin, clay, silica and mixtures thereof.

In a preferred embodiment of the invention the surface treating agent with which the pigment particles are treated may be beef tallow or rosin which are inexpensive and readily available.

DETAILED DESCRIPTION OF THE INVENTION

Figure 1:
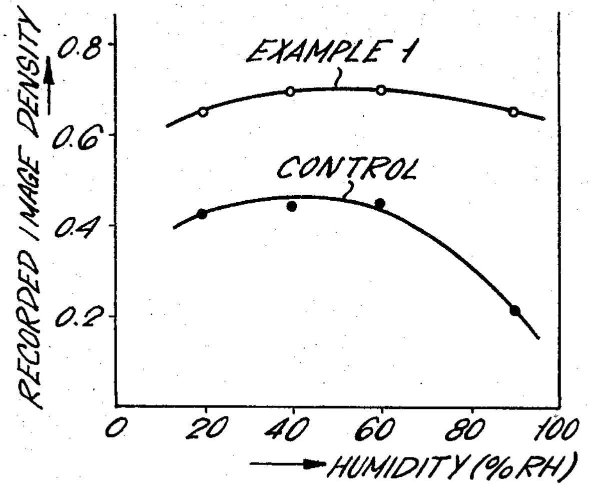
FIG. 1 illustrates the humidity-recorded image density characteristics of an electrostatic recording sheet according to the invention and an electrostatic recording sheet prepared by a conventional method.

The electrically conductive substrate used for the present invention may be prepared by any conventional method. The substrate may be any of natural fiber paper, synthetic fiber paper, plastic film, metal foil and the like. In general, however, natural fiber paper is preferably used because of its economical availability and workability.

The substrate should be electrically conductive, preferably, in such a degree as to have a volume resistance within the range of $10^5$ to $10^{11}$ ohm. For this purpose the natural fiber paper is preferably impregnated with or coated with inorganic salts, carbon black, metal powder or polyelectrolytes alone, or together with a barrier such as latexes, polyvinyl alcohol, pigment etc.

The electrostatic recording material in this invention can be used not only in a system for impressing signal charges directly onto a surface of the dielectric material layer, but also as a charge receptor medium (charge-retentive-layer) in the so-called "method of transfer of electrostatic latent images" wherein latent images formed on a master plate are transferred or offset to another charge-retentive-layer on which visible images are developed. The range of electric resistance value of the substrate in the latter case may be broader than that in the former case. In other words, the volume registance of the substrate in the latter case may be larger than $10^{11}$ ohm.

According to the invention, the dielectric layer formed on the electrically conductive substrate is essentially made of an insulating polymeric material and finely divided pigment powder or particles. The dielectric layer may preferably be formed by coating a surface of the substrate with a composition consisting essentially of an insulating polymer and pigment particles dispersed therein.

Among insulating, highly polymeric materials which can be used for forming the dielectric layer there may be included polystyrene, polyacrylic acid, polyacrylic esters, polymethacrylic esters, polyvinylidene chloride, polyvinyl acetate, polyvinylbutyral, polyacetal, nitrocellulose, silicone resin, copolymers of vinylacetate and acrylic ester, copolymers of vinyl acetate and methacrylic ester, copolymer of vinylacetate and styrene copolymer of vinylacetate and vinyl chloride, copolymer of vinylacetate and crotonic acid, etc.

Finely divided powder or particles contained in the dielectric layer of the electrostatic recording material according to the invention may be either inorganic or organic pigment particles. Among the typical inorganic pigments there are included calcium carbonate, titanium oxide, zinc oxide, barium sulfate, kaolin, clay, silica, etc. Although organic pigments such as starch powder, starch derivative powder, powder of cellulose fiber and finely divided powder of synthetic copolymers may also be used for the invention unless they remarkably deteriorate the electric characteristics and so far as they can hold or carry the surface treating agent for which a detailed description is given hereinafter, inorganic pigments are preferred because the most typically useful treating agent can more firmly adhere to those inorganic pigments than to organic pigments.

According to the invention, the finely divided pigment particles are treated with and carry thereon a surface treating agent which is a member selected from the group consisting of fatty acids having at least 5 carbon atoms, esters thereof with glycerin or other alcohols, salts of said fatty acids, resin acids, salts of resin acids and mixtures of the foregoing.

Among the useful fatty acids having at least 5 carbon atoms there are included caproic acid, caprylic acid, capric acid, lauric acid, myristic acid, palmitic acid, stearic acid, arachic acid, lignoceric acid, montan acid, oleic acid, linolic acid, linolenic acid, etc. Glycerine esters, other polyhydric alcohol esters, ammonium salts and monovalent or polyvalent metal salts of those fatty acids may also be used as well.

Fatty acids having 4 or less carbon atoms or esters and salts thereof are not useful for the invention because they deteriorate electric characteristics, including insulating resistivity.

Instead of the above mentioned fatty acids or esters or salts of fatty acids, resin acids such as abietic acid, pimaric acid, benzoic acid, etc. and metal salts of those resin acids may also be used as the surface treating agent.

Among the metals which can form salts with the above mentioned fatty acids and resin acids there may be included lithium, sodium, potassium, zinc, calcium, mercury, copper, lead, nickel, barium, magnesium, cobalt, aluminum, etc.

The above compounds may be used solely or as a mixture of any two or more of the items.

Above all, fats and oils such as beef tallow, Japan wax and palm kernel oil as well as rosin are preferably used because they are commercially and economically available.

Adhesion or adsorption of the surface treating agent to the finely divided pigment powder or particles may be carried out by any methods, either conventional or novel. For example, in the step of producing precipitated calcium carbonate by blowing carbon dioxide into milk or lime a fatty acid is added to the system before an excess amount of carbon dioxide is blown through the system under pressure to complete the reaction, namely while unreacted lime hydroxide still remains. In the case of using heavy calcium carbonate or any other inorganic pigments, finely divided pigment powder is homogeneously mixed with a fatty acid treating agent at an elevated temperature, and the mixture is then pulverized after cooling.

The pigment particles may preferably have an average particle size of about 0.5 to 10 $\mu\phi$. If the particle size is too small, the electric discharge ability to the surface of the recording material is not as improved. If the particle size is too large, white spots are produced.

The amount of the surface treating agent carried by the pigment particles may preferably be at least 0.2% by weight of the pigment particles. The electrostatic recording characteristics such as charyl acceptance and charyl decay are improved as the amount of the surface treating agent is increased. However, if the amount of the surface treating agent exceeds 10% by weight of the pigment particles, no further improvement of the electrostatic recording characteristics is appreciated. It is not preferred to adsorb the surface treating agent described on the pigment particles in an amount of 15% or higher by weight of the pigment particles since it will only result in deteriorating the electrostatic recording characteristics.

The electrostatic recording material having a dielectric layer in which the pigment particles treated with the surface treating agent described are dispersed can produce, on the surface of the dielectric layer, recording images having a high resolution and a high density.

In the dielectric layer containing therein the pigment particles treated with the surface treating agent described, a uniform electrification is accomplished and the decay of charge is prevented, so that the recording images produced on the dielectric layer may have a high resolution and a high density. Particularly, the dielectric layer prepared according to the invention is superior in the electrostatic recording characteristics even at a high temperature and at a high humidity.

Where inorganic pigment which is not treated with any surface treating agent is used in the dielectric layer, the amount of the inorganic pigment is limited to at best 20 to 30% by weight of the dielectric layer because if the amount of the inorganic pigment exceeds this limit the electrostatic recording characteristics are deteriorated. But where an inorganic pigment treated with a surface treating agent according to the invention is used in the dielectric layer of the electrostatic recording material, no substantial deterioration in the electrostatic recording characteristics is realized even with use of the inorganic pigment in such a great amount as 80% by weight of the dielectric layer.

PREFERRED EMBODIMENT OF THE INVENTION

The following examples serve to illustrate the invention in more detail although the invention is not limited to the examples. Unless otherwise indicated, the amounts of the components are designated by parts by weight.

EXAMPLE 1

A paper substrate was prepared by treating a wood free paper sheet of 60 $g/m^2$ with a cationic electro-conductivity-improving agent known as "ECR-34" (DOW Chemical). The amount of ECR-34 applied to the paper sheet was 3 $g/m^2$ solid. Separately, in the process for preparation of precipitated calcium carbonate in which stearic acid is mixed with milk of lime and then an excess amount of carbon dioxide is blown into milk of lime, one part of stearic acid was absorbed to 100 parts of pigment particles. The product was classified to obtain surface treated calcium carbonate of about 1.8 micron in average particle size.

40 parts of the above-obtained calcium carbonate was mixed in 300 parts of methyl ethyl ketone together with 60 parts of polyvinylbutyral to produce a coating composition. The coating composition was applied onto the said paper substrate by 6 $g/m^2$ on dry basis and dried. Thus an electrostatic recording material having a mat-finished appearance and a good receptivity for writing was produced.

As a control, an electrostatic recording material was produced under the same condition as mentioned in the above except using calcium carbonate of 1.8 micron in average particle diameter which was not treated with stearic acid.

Both electrostatic recording materials mentioned above were examined at various conditions of humidity by an electrostatic facsimile recording device with a recording head having a line density of 8 lines/mm and an applied voltage of −700V. The electrostatic recording material in this example produced recording images having a density much higher than in the control as shown in FIG. 1 (measured by a reflection densitometer produced by Tokyo Koden) and a stability to humidity.

The density of the produced recording images in each of the Examples were measured according to JIS K 7611 with use of a reflection densitometer produced by Tokyo Koden. As is apparent from FIG. 1 in which the humidity-recorded image density curves are illustrated, the recorded images in the Example according to the invention has a density much higher than that in the control example.

EXAMPLE 2

An electrostatic recording material was prepared in the same way as in Example 1 except using magnesium stearate as the surface treating agent for calcium carbonate instead of the stearic acid used in Example 1. The recording characteristics of the electrostatic recording material thus obtained were as good as Example 1.

EXAMPLE 3

A paper substrate was prepared by impregnating a wood free paper sheet of 60 $g/m^2$ with 10% aqueous solution of calcium chloride. On the other hand, heavy calcium carbonate treated with beef tallow was prepared. The amount of beef tallow added to heavy calcium carbonate was one part of the heavy calcium carbonate. The surface treated heavy calcium carbonate had an average particle diameter of about 3 micron. The heavy calcium carbonate thus treated was then mixed with polymethyl methacrylate in toluene with various composition ratios to obtain four different coating compositions. The composition ratios of calcium carbonate to polymethyl methacrylate in those four compositions were 10:90, 40:60, 60:40 and 80:20 by weight, respectively. The coating compositions thus obtained were applied onto the paper substrate by 6 $g/m^2$ on dry basis and then dried. Four electrostatic recording materials having a mat-finished appearance and a good receptivity for writing were thus produced.

For controls, four electrostatic recording materials were prepared in the same way as the example mentioned in the above, except using untreated heavy calcium carbonate of 3 micron in average particle diameter.

Figure 2:
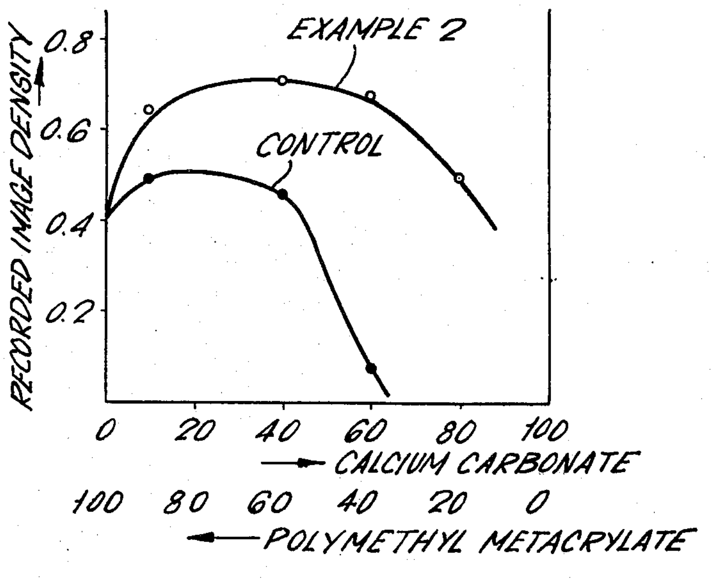
FIG. 2 illustrates the pigment content-recorded image density characteristics for the examples according to the inventions and the control examples.

Each of those electrostatic recording materials thus obtained was examined at 25°C and 60% RH by a commercially available facsimile device with a recording head having a line density of 8 lines/mm and an applied voltage of −700V and the density of recording images was measured according to JIS K7611 with use of a reflection densitometer (produced by Tokyo Koden). The results are illustrated in FIG. 2 in which the composition ratio-recorded image density curves are illustrated. As observed from FIG. 2, the recorded image density in each of the examples according to the invention is much higher than that of each of the controls and according to the invention the content of calcium carbonate can be increased to such an extent as 80% or higher by weight of polymethyl methacrylate.

EXAMPLE 4

A paper substrate was prepared by impregnating a wood free paper sheet of 60 $g/m^2$ with 10% aqueous solution of calcium chloride. On the other hand, barium sulfate (baryte) powder treated by beef tallow was prepared. The amount of beef tallow absorbed by barium sulfate powder was 1% by weight of the barium sulfate powder. The surface treated barium sulfate powder had an average particle diameter of 3.8 micron. The barium sulfate powder thus treated was mixed with a copolymer of vinyl chloride and vinyl acetate in a composition ratio of 4:6 by weight in methyl ethyl ketone to obtain a coating composition. The coating composition thus obtained was applied onto the paper substrate by 6 $g/m^2$ on dry basis and then dried. The electrostatic recording material having a mat-finished appearance and a good receptivity for writing was thus produced.

A control example was prepared in the same manner as mentioned above except using barium sulfate (baryte) powder which was not treated with any surface treating agent.

Each of the electrostatic recording materials thus obtained was examined at 25°C and 60% RH by commercially available facsimile device with a recording head having a line density of 8 lines/mm and an applied voltage of −700V and the density of each of the recorded images was measured. The density of the recorded images on the electrostatic recording material prepared according to the invention is much higher than that of the control example using untreated barium sulfate.

EXAMPLE 5

Another electrostatic recording material was prepared in the same manner as described in Example 4 except using finely divided silica powder having an average particle diameter of about 2.5 micron instead of the barium sulfate (baryte) powder described in Example 4. The electrostatic recording material thus prepared showed a mat-finished appearance and good writability, and was as superior in recording characteristics as the material in Example 4.

EXAMPLE 6

100 parts of clay having an average particle diameter of 2.5 micron and 4 parts of gum rosin were added in 30 parts of acetone and mixed together. Then acetone was evaporated from the obtained acetone solution of gum rosin. The surface of clay was thus treated.

50 parts of water added to a mixture of 50 parts of clay thus pretreated with 200 parts of 25% ammoniacal solution of copolymer of ethylene and methacrylic acid yield a homogeneous coating composition. The coating composition was applied by 8 g/m$^2$ on dry basis onto one side of a wood free paper of 60 g/m$^2$, coated on the other side with cationic conductive material (DOW, ECR-34) by 2 g/m$^2$ on dry basis, and thereby an electrostatic recording material was produced.

The electric-charge-retentive layer of the above electrostatic recording material was brough into contact with an electrophotosensitive plate surface having latent electrostatic images produced by a conventional method of electrophotography, the electrophotosensitive plate being obtained by forming a photosensitive layer of polyvinyl carbazole on aluminium plate. The backsides of the electrostatic recording material and the electrophotosensitive plate were allowed to short-circuit. By separating both the layers from each other, electrostatic latent images were transferred to the said layer of electrostatic recording layer. Then, the latent images were made visible by a liquid toner and thereby distinctive images were obtained. On the other hand, a coating composition was produced with use of untreated clay and applied to the electrostatic recording material. In this case, the image density was much lower than in the above case.

What we claim is:

1. An electrostatic recording material consisting essentially of an electrically conductive substrate and a dielectric layer formed on a surface thereof, said dielectric layer being essentially formed with an insulating polymeric material and pigment particles, said pigment particles having an average particle size of about 0.5 to 10 $\mu\phi$, said pigment particles carrying thereon a surface treating agent which is a member selected from the group consisting of fatty acids having at least 5 carbon atoms, polyhydric alcohol esters of said fatty acids, ammonium salts and metal salts of said fatty acids, resin acids, metal salts of said resin acids and mixtures of the foregoing.

2. An electrostatic recording material according to claim 1, wherein said pigment particles are particles of an inorganic pigment.

3. An electrostatic recording material according to claim 2, wherein said inorganic pigment is a member selected from the group consisting of calcium carbonate, titanium oxide, zinc oxide, barium sulfate, kaolin, clay, silica and mixtures thereof.

4. An electrostatic recording material according to claim 1, wherein the surface treating agent is fat.

5. The electrostatic recording material according to claim 4, wherein said fat is beef tallow.

6. The electrostatic recording material according to claim 1, wherein said surface treating agent is rosin.

7. The electrostatic recording material according to claim 1, wherein the substrate consists of a member selected from the group consisting of natural fiber paper, synthetic fiber paper, plastic film and metal foil.

8. The electrostatic recording material according to claim 7, wherein said substrate is rendered electrically conductive by incorporation of at least one member selected from the group consisting of inorganic salts, carbon black, metal powder and polyelectrolytes.

9. The electrostatic recording material according to claim 8, wherein said substrate is natural fiber paper.

10. The electrostatic recording material according to claim 1, wherein said electrically conductive substrate includes a barrier consisting of at least one member selected from the group consisting of latex, polyvinyl alcohol and pigment.

11. The electrostatic recording material according to claim 1, wherein said insulating polymeric material consists of at least one member selected from the group consisting of polystyrene, polyacrylic acid, polyacrylic esters, polymethacrylic esters, polyvinylidene chloride, polyvinyl acetate, polyvinylbutyral, polyacetal, nitrocellulose, silicone resin, copolymers of vinyl acetate and acrylic ester, copolymers of vinyl acetate and methacrylic ester, copolymers of vinyl acetate and styrene, copolymers of vinyl acetate and vinyl chloride, copolymers of vinyl acetate and crotonic acid, and copolymers of ethylene and methacrylic acid.

12. The electrostatic recording material according to claim 1, wherein said surface treating agent is present in the amount of at least 0.2% by weight of said pigment particles.

* * * * *